United States Patent [19]

Hegyi

[11] Patent Number: 5,703,568
[45] Date of Patent: Dec. 30, 1997

[54] MULTI FUNCTION LIGHT SENSOR FOR VEHICLE

[76] Inventor: Dennis J. Hegyi, 1708 Morton, Ann Arbor, Mich. 48104

[21] Appl. No.: 599,272

[22] Filed: Feb. 8, 1996

Related U.S. Application Data

[63] Continuation of Ser. No. 59,597, May 7, 1993, abandoned.

[51] Int. Cl.⁶ .................................................... G08B 21/00
[52] U.S. Cl. ........................ 340/602; 340/604; 250/514; 15/DIG. 15; 15/250.001; 15/250.12; 318/483; 318/DIG. 2
[58] Field of Search ............................... 340/602, 604; 15/DIG. 15, 250.001, 250.12; 250/574; 318/DIG. 2, 483

[56] References Cited

U.S. PATENT DOCUMENTS

| | | | |
|---|---|---|---|
| 4,131,834 | 12/1978 | Blaszkowski | 318/483 |
| 4,355,271 | 10/1982 | Noack | 318/480 |
| 4,481,450 | 11/1984 | Watanabe et al. | 318/444 |
| 4,485,452 | 11/1984 | Boegh-Peterson | 318/444 |
| 4,620,141 | 10/1986 | McCumber et al. | 318/483 |
| 4,798,956 | 1/1989 | Hochstein | 250/341 |
| 4,859,867 | 8/1989 | Larson et al. | 307/10.1 |
| 4,867,561 | 9/1989 | Fujii et al. | 356/237 |
| 4,871,917 | 10/1989 | O'Farrel et al. | 250/341 |
| 4,916,373 | 4/1990 | Al-Attar et al. | 318/443 |
| 4,931,167 | 6/1990 | Albrecht et al. | 340/602 |
| 4,956,591 | 9/1990 | Schierbeek | 318/483 |
| 4,987,354 | 1/1991 | Steinmann | 318/444 |
| 5,059,877 | 10/1991 | Teder | 318/444 |
| 5,105,129 | 4/1992 | Shimuzu et al. | 318/266 |
| 5,119,002 | 6/1992 | Kato et al. | 318/444 |
| 5,140,233 | 8/1992 | Wallrafen | 318/264 |
| 5,140,234 | 8/1992 | Wallrafen | 318/264 |

FOREIGN PATENT DOCUMENTS

| | | |
|---|---|---|
| 41 39 515 A1 | 6/1992 | Germany. |
| 41 23 641 A1 | 1/1993 | Germany. |
| 62-043543 | 2/1987 | Japan. |

*Primary Examiner*—Jeffery Hofsass
*Assistant Examiner*—Julie B. Lieu
*Attorney, Agent, or Firm*—Rohm & Monsanto

[57] ABSTRACT

A system for detecting the presence of rain droplets on a windshield employs a source of light, such as an LED, and a photodetector installed on the instrument panel of a vehicle. The LED and the photodiode are arranged with respect to one another such that light from the LED cannot reflect directly off the windshield into the photodiode. Only when the light from the LED is backscattered by an environmental condition, such as the raindrops on the exterior of the windshield, the condensation of moisture on the interior of the windshield, or the presence of smoke in the cabin, will the photodiode receive the light from the LED. Each of these environmental conditions has a predeterminable characteristic signature which permits the processing of data to detect same. An ambient light signal is subtracted from the combination of the rain and ambient light signals by pulsed operation of the LED and subtracting the ambient light signal, which is detected when the LED is dark, from the combined LED and ambient light signal which is present when the LED is illuminated.

22 Claims, 4 Drawing Sheets

FIG. 1

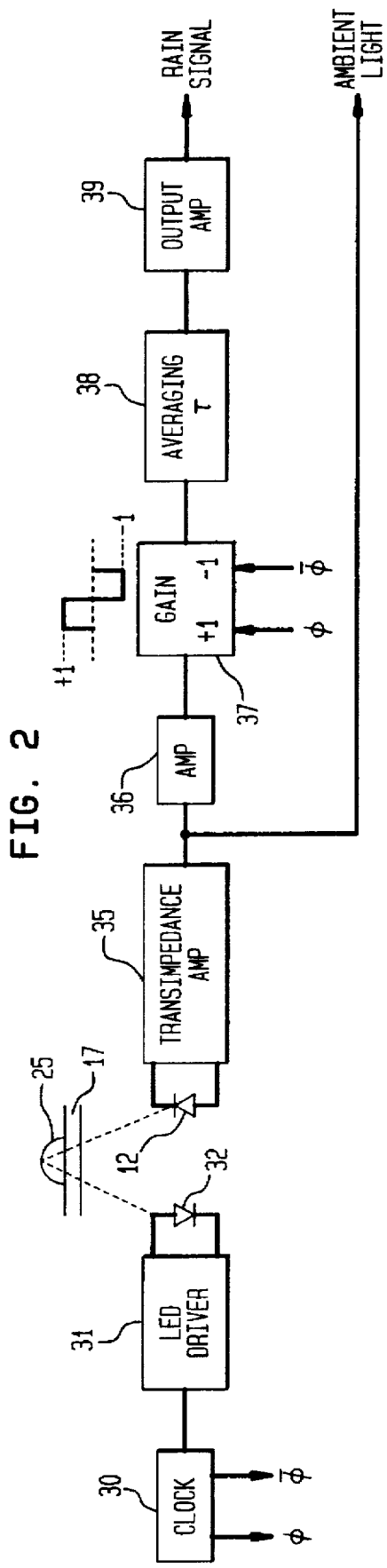
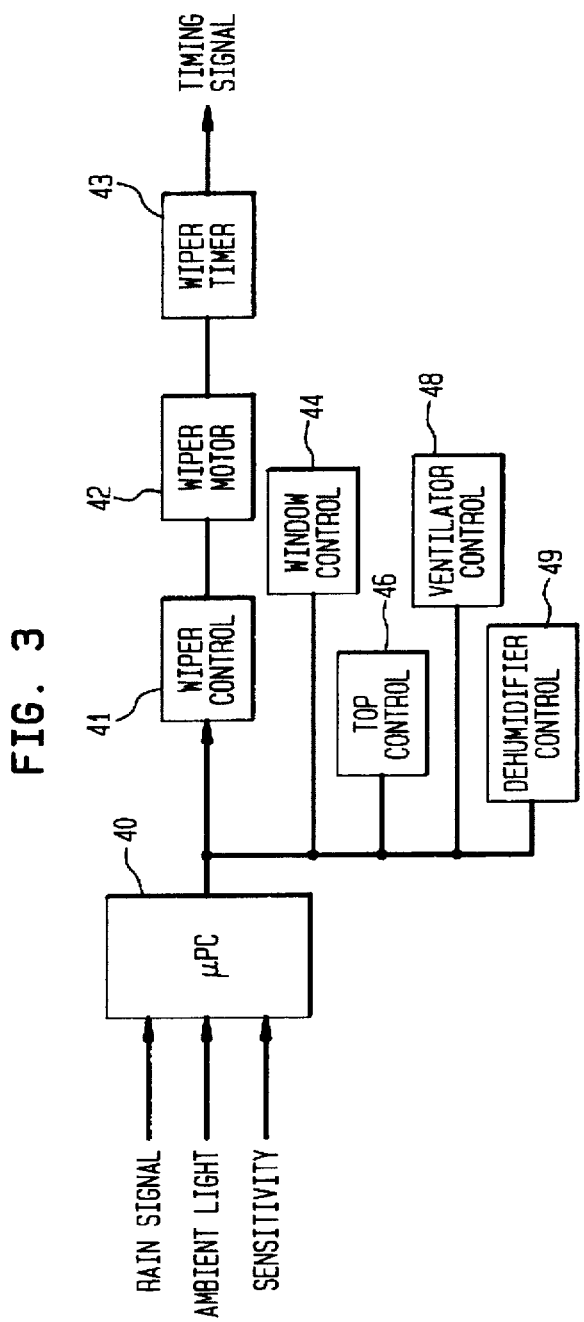
FIG. 2
FIG. 3

MULTI FUNCTION LIGHT SENSOR FOR VEHICLE

This application is a continuation of application Ser. No. 08/059,597 filed on May 7, 1993, now abandoned.

BACKGROUND OF THE INVENTION

1. Field of the Invention

This invention relates generally to systems and arrangements for determining the presence of a plurality of environmental conditions in relation to a vehicle, and more particularly, to a system which can control the operation of a device, such as the windows, the convertible roof, the air conditioner, a dehumidifier, the ventilation system, or the windshield wipers of a vehicle, in response to the presence of droplets of liquid on a transparent surface thereof, such as the windshield of the vehicle, the presence of condensation on the interior of the windshield of the vehicle, or the presence of smoke in the vehicle.

2. Description of the Related Art

Numerous efforts have been made in the prior art to provide a system which reliably will control the windshield wipers of a vehicle in response to the presence of water on the windshield. In addition to failing to meet the level of reliability required to avoid the annoying and distracting false triggering of windshield wipers, the majority of the known arrangements must be installed directly onto the windshield, resulting in unsightly wiring extending from a sensor which has been bonded to the interior of the windshield. With respect to the false triggering of the windshield wipers, many of the known arrangements will trigger a false indication of rain in response to fluctuations in the ambient light, as would be the case with a vehicle traveling under the shadows of telephone poles, or under highway lamps.

Existing optical rain sensors of the type which are usually installed within vehicles are mounted on the windshield in the wiper path. Optical sensors generally include a light source, such as an LED, and a photodetector, usually a phototransistor or a photodiode, arranged such that when no raindrops are on the windshield, light from the LED is totally internally reflected at the outside surface of the windshield to a photodiode. If a drop of rain is deposited on the windshield where the light beam is reflected, the conditions for total internal reflection are violated, and the intensity of light in the reflected beam is reduced. In these known systems, a relatively large array of LEDs and photodiodes are required to monitor a few square inches on the windshield. The extent of the monitored region of the windshield must be sufficiently large to provide an accurate sample of the random distribution of raindrops which fall on the surface of the windshield. As stated, the array of LEDs and photodiodes must be mounted inside the vehicle on the windshield in the wiper path.

Another problem associated with known arrangements is that of cost. In most of the presently available designs, one photodetector is required for each LED in the array. There is, therefore, a need for a rain sensor which is economical and which need not be installed on the windshield of the vehicle.

In addition to water depositing on the outer surface of the windshield, water will collect on the interior of the windshield in the form of condensed water vapor. Such condensed water vapor can, within a matter of minutes, reduce the visibility through the window to a dangerous level. In such situations, it is essential that the defogger function be carried out by cycling the air conditioner to dehumidify the air. The operation of the air condition generally will decrease the amount of fog on the interior of the windshield in a relatively short period of time.

It is additionally useful in a vehicle to reduce the accumulation of smoke in the cabin of the vehicle which would result from the smoking of tobacco by the occupants. On occasion, the operator of the vehicle would be reluctant to embarrass a smoking passenger by obvious manipulation of the ventilator controls. Accordingly, it would be desirable for the ventilator to be operated automatically in response to the presence of smoke in the cabin.

It is, therefore, an object of this invention to provide an arrangement which is simple and will reliably detect the presence of water droplets on the outside of a windshield of a vehicle.

It is another object of this invention to provide an arrangement which is simple and will reliably detect the presence of condensed water vapor on the inside of a windshield of a vehicle.

It is also an object of this invention to provide an arrangement which is simple and will reliably detect the presence of smoke in the cabin of a vehicle.

It is a further object of this invention to provide a system for automatically operating the windshield wipers of a vehicle in response to the presence of water on the windshield.

It is additionally an object of this invention to provide a system for automatically operating an air conditioning or dehumidification system of a vehicle in response to the presence of condensed water vapor on the windshield.

It is yet a further object of this invention to provide a system for automatically operating the cabin ventilation system of a vehicle in response to the presence of smoke, such as cigarette smoke, in the cabin of the vehicle.

It is also another object of this invention to provide a system which responds to the effect on light by several environmental conditions, while maintaining immunity to variations in the ambient light levels.

It is yet an additional object of this invention to provide a system which responds to the effect on light by several environmental conditions, in the vicinity of the windshield of the vehicle, without the need for establishing a direct contact between the system and the windshield.

It is still another object of this invention to provide a windshield wiper control sensor which need not be installed directly on the windshield of the vehicle.

It is a yet further object of this invention to provide a windshield wiper control sensor which can be installed on the instrument panel of the vehicle.

SUMMARY OF THE INVENTION

The foregoing and other objects are achieved by this invention which provides apparatus and method for controlling the operation of the windshield wipers of a vehicle in response to the deposition of water on the exterior of the windshield; the operation of the air conditioning system in response to the formation of water condensation on the interior of the windshield of the vehicle; and the operation of the ventilator system in response to the presence of smoke in the cabin of the vehicle.

In accordance with a first aspect of the invention, an arrangement is provided for detecting the presence of water droplets on the windshield of a vehicle. A light source produces a radiant energy and directs same toward the windshield. A first reflected portion of the radiant energy is reflected by the windshield, and a second portion of the radiant energy is scattered by the water droplets on the windshield. A light sensor having an input for receiving an ambient light and a received portion of the second reflected portion of the radiant energy from the light source is additionally provided. The reflected portion of the radiant energy has an amplitude which is responsive to the number of water droplets on the windshield. The light sensor further has a sensor output for producing a sensor output electrical signal which is responsive to the light received at the input. There is additionally provided a circuit which is coupled to the sensor output for providing a first electrical signal responsive to the received portion of the second reflected portion of the radiant energy from the light source. The sensor output also produces a second electrical signal which is substantially responsive to the ambient light.

In a specific illustrative embodiment of the invention, the second reflected portion of the radiant energy corresponds substantially to the proportion of the windshield which is covered by the water droplets.

In a highly advantageous embodiment of the invention, the circuit is provided with a driver which is coupled to the light source means. The driver produces a cyclical enabling signal having sequential first and second states for causing the light source to produce the radiant energy only during intervals of time that the cyclical enabling signal is in the first state. The circuit may be provided with an amplifier coupled to the sensor output for producing an amplified signal corresponding to the electrical signal responsive to the light which is received at the input of the light sensor.

A phase-responsive device is coupled to the amplifier and to the driver for producing a time-varying signal which is responsive to a difference between the magnitude of the sensor output electrical signal when the cyclical enabling signal is in the first state, and the magnitude of the sensor output electrical signal when the cyclical enabling signal is in the second state. In one embodiment, first and second amplifier stages are provided, each having a predeterminable gain characteristic. The first and second amplifier stages are AC-coupled to one another.

In a still further embodiment of the invention, there is provided an integrator coupled to the phase-responsive device for integrating the time-varying signal over time to produce a rain signal. The integrator has an integration time constant characteristic which is longer than a cycle of the cyclically enabling signal. There is additionally provided a processor having a plurality of inputs for receiving the rain signal and the second electrical signal which is substantially responsive to the ambient light. A control signal is produced at the output of the processor. The responsiveness of the overall device to the quantum of water droplets on the windshield is adjustable with a sensitivity control which is coupled to the processor. The control signal is used to operate the windshield wiper.

In certain embodiments of the invention, a windshield wiper timer is employed to produce a signal which is responsive to the duration of a wipe cycle of the windshield wiper. This is useful to determine whether the windshield is wet or dry, since a wipe cycle generally will take longer on a dry windshield.

The control signal at the output of the processor is not limited to operation of the windshield wipers. In some embodiments of the invention, the control signal may be applied to operate a window, such as a power window, which would be closed in the event rain is detected. In other embodiments, the control signal may be employed to operate a convertible top, which would be closed in response to the detection of rain.

In a preferred embodiment of the invention, the cyclical enabling signal has a frequency within a range of approximately between 5 kHz and 100 kHz. The integration time constant has a value of approximately between 0.5 ms and 250 ms. In addition, a structure, which may be in the form of a light baffle with one or more apertures therethrough for controlling or otherwise defining the field of view of the light sensor, may be employed, particularly with respect to the light sensor.

In accordance with a further aspect of the invention, an arrangement is provided for producing a controlled signal in response to the presence of liquid droplets on a first surface of a translucent material. In accordance with this further aspect of the invention, a light source produces a radiant energy and directs same toward at least a portion of a second surface of the translucent material. A first portion of the radiant energy is reflected by the translucent material, and a second portion of the radiant energy is scattered by the water droplets on the translucent material. A light sensor having an input for receiving an ambient light and a received portion of the second portion of the radiant energy from the light source, is provided. The second portion of the radiant energy has an amplitude which is responsive to the number of water droplets on the first surface of the translucent material. The light sensor is further provided with a sensor output for producing a sensor output electrical signal which is responsive to the light received at the input. A cyclical driver is coupled to the light source for causing same to produce the radiant energy during a portion of a cycle, at a predetermined cycle frequency. In addition, control signal circuitry which is coupled to the light sensor and to the cyclical driver produces a control signal in response to a differential between the magnitude of the sensor output electrical signal when the light source is illuminated, and the magnitude of the sensor output electrical signal when the light source is dark, during a cycle of the cyclical driver.

In a specific embodiment of this aspect of the invention, there is provided circuitry for producing an ambient light signal which is substantially responsive to an ambient light impinging on the input of the light sensor. A controller produces a controller signal which is responsive to the ambient light signal and the control signal produced by the control signal circuitry. Additionally, there is provided a sensitivity adjustment which is coupled to the controller for adjusting the sensitivity of the arrangement with respect to the number of water droplets on the first surface of the translucent material.

In accordance with a first method aspect of the invention, a process is applied to produce a signal which is responsive to the droplets of liquids on a first surface of a translucent material. The method is provided with the steps of:

illuminating a second surface of the translucent material with a cyclically varying light which is in an illuminated state for a first portion of a cycle and dark for a second portion of said cycle;

receiving at a light sensor an ambient light and a portion of the cyclically varying light which is scattered by the droplets of the liquid on the first surface of the translucent material, and producing at an electrical output of the light sensor a sensor signal corresponding to the light received by the light sensor; and producing a difference signal responsive to the difference in the magnitude of the sensor signal between the first and second portions of said cycle.

In accordance with a further method aspect of the invention, the inventive method produces a plurality of signals, each responsive to a predetermined environmental condition of a vehicle of the type having a windshield, the method comprising the steps of:

energizing a source of illumination whereby electromagnetic energy is directed toward an interior surface of the windshield, the electromagnetic energy being in the form of a cyclically varying light which is in an illuminated state for a first portion of a cycle and dark for a second portion of said cycle;

receiving at a light sensor an ambient light and a portion of the cyclically varying light which has been scattered in response to the environmental condition; and producing at an electrical output of the light sensor a sensor signal corresponding to the light received by the light sensor.

In one embodiment of this further method aspect of the invention, the environmental condition is in the form of water droplets which are deposited on the exterior of the windshield. In another embodiment of the invention, the environmental condition is water vapor condensing on the interior of the windshield. In this embodiment, the cyclically varying light is scattered by the condensed water vapor. In a still further embodiment of the invention, the environmental condition is the presence of smoke particles in the vehicle, in the path between the source of illumination and the light sensor. In such an embodiment, the cyclically varying light is scattered by the smoke particle.

It is important to recognized that any one or all of the aforementioned environmental conditions which are detected, can be detected by the same structure. The identification of the particular environmental condition which is present with respect to the vehicle is determinable by software. For example, when a car is operated in a defogger mode where the defogger function is carried out by cycling the air conditioner to dehumidify the air, it is observed that when the relative humidity inside the car is such that moisture condenses out on the windshield, the amount of fog on the windshield increases until the air conditioner cycles on after which the fog level rapidly decreases. One feature which is characteristic of the process is that the time for moisture to buildup is always longer than the time for the moisture to evaporate from the windshield. The time for moisture to buildup is rarely less than about 20 seconds, and could last several minutes, while the evaporation can occur over a time from a few seconds to perhaps over a minute.

Smoking has a characteristic signature, which is distinct, but not quite as distinct as for moisture condensing on the windshield. Smoking has a time scale of significant variations within a few seconds. Also, the time for smoke to buildup is always smaller than the time for it to dissipate.

With respect to a signal for condensing moisture and fog, as detected by a rain detector structure, as will be described herein, it is noted that moisture condensing out on the windshield scatters light back from the light source, which may be in the form of LEDs, which is superimposed on the rain signal and detected by the photodiode after passing through a lock-in amplifier. Also, smoke which passes between the LED and the windshield will increase the amount of backscattered radiation detected by the photodiode after passing through the lock-in amplifier, and will be superimposed on the rain signal. In such an embodiment which is subjected to all three types of environmental conditions, software can be applied to separate out the three different signals, i.e., rain, fog, and smoke, without the confusion of triggering on the windshield wipers in the presence of only fog and smoke.

BRIEF DESCRIPTION OF THE DRAWING

Comprehension of the invention is facilitated by reading the following detailed description, in conjunction with the annexed drawing, in which:

FIG. 2 is a function block representation of circuitry used in combination with the structure of FIG. 1 to produce signals corresponding to the presence of rain or fog on the windshield, or smoke, and the magnitude of the impinging ambient light;

FIG. 3 is a function block representation of a microprocessor which receives the signals generated by the structure in FIG. 2 and controls a windshield wiper control unit;

DETAILED DESCRIPTION

Figure 1:
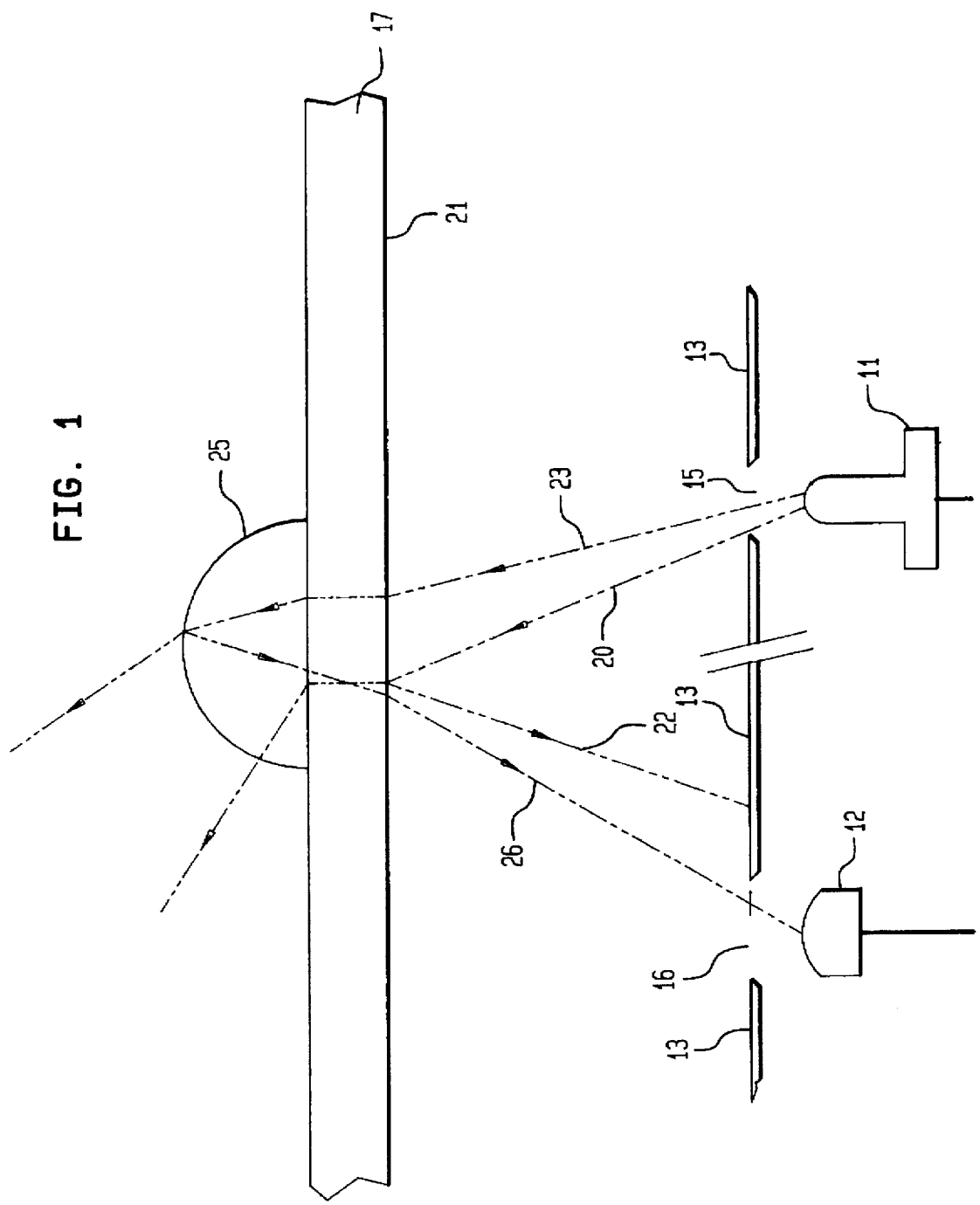
Fig. 1 is a schematic representation of certain elements of structure which are arranged in accordance with the principles of the invention.

FIG. 1 is a schematic representation of certain elements of structure configured in accordance with the principles of the invention. More specifically, a light source, in the form of LED 11 and a photodiode 12 are arranged beneath a baffle 13 having an aperture 15 therethrough for LED 11 and an aperture 16 for photodiode 12. Baffle 13 may be the top surface of the instrument panel (not shown) of a vehicle (not shown). As will be discussed hereinbelow, apertures 15 and 16 are configured to prevent light from being reflected directly to the photodiode by the windshield.

The operation of baffle 13 with apertures 15 and 16 therethrough is illustrated in FIG. 1. As shown, a light ray 20 is propagated from LED 11 and impinges upon inner surface 21 of windshield 17. The light ray is reflected back as a reflected ray 22, which is shown in the figure to impinge upon baffle 13. Some of the light from LED 11, such as light ray 23, impinges upon inner surface 21 of the windshield, where it is refracted into and through the windshield to a raindrop 25. The raindrop backscatters the light along a backscattered ray 26 which is propagated through apertures 16 and into photodiode 12. Thus, it can be seen that the light from LED 11 is directed to photodiode 12 only after being backscattered, such as by a raindrop. The intensity of light reflected at an interface is related to the ratio of the indices of refraction of the two media on opposite sides of the interface. The index of refraction of most glasses is about 1.5, while the index of refraction of water is 1.33, and the index of refraction of air is 1.00. When a raindrop is present, instead of a reflection arising at the outer surface of the windshield because without the raindrop the discontinuity in the index of refraction between the glass and air is relatively large, the light from the LED is transmitted into the raindrop and the reflection occurs at the discontinuity of the index of refraction at the curved air-water interface at the outer surface of the raindrop. This surface reflects light back into the vehicle over a large angular range, some of the rays striking the photodiode.

The photodiode signal is proportional to the fractional area of the windshield covered by raindrops which is relatively similar to the way human vision is interfered with by raindrops. The angular range over which light is reflected depends upon the cross-sectional width of the raindrop at the water-glass interface, i.e., the diameter of the part of the raindrop touching the glass, and, to the extent that its outer surface can be approximated as a sphere, by the radius of that sphere. If the width-to-radius ratio were the same for different size raindrops, they would all reflect light over the same angular range. Assuming spherical raindrops with the same width-to-radius ratio, the amount of light reflected into a given direction depends only on the cross-sectional contact area of the raindrop. Thus, the total amount of light reflected back into the photodetector is proportional to the area of the glass covered by raindrops. Also, the visual obscuration of the rain is approximately proportional to the area covered by the raindrops. From this, one can conclude that the intensity of light reflected by raindrops on a windshield back to the photodiode is a good measure of the obscuration caused by rain that a driver experiences and that the signal detected by this rain sensor is an appropriate one to gage the visual perception of rain by a driver.

The rain detector system of the present invention must work under a variety of conditions. Occasionally, the sun is shining when it is raining, and the LED light reflected by raindrops must be detectable in sunlight. This is achieved by modulating LED 11 at a reference frequency and picking out the photodiode current at the same frequency in phase with the modulated LED light using a type of phase-sensitive amplifier, sometimes referred to as a lock-in amplifier.

Referring once again to FIG. 1, light rays 20 and 23 are shown to exit LED 11. As previously described, light ray 20 is reflected from inner surface 21 of windshield 17 and is propagated through aperture 16 of the photodiode. Any ray which exits further to the left will strike aperture 15 of LED 11, and therefore, one is assured that no rays which are directly reflected by the windshield will reach photodiode 12. However, it is possible that a ray from LED 11 will be scattered twice and reach the photodiode. With reasonable care being paid to designing the apertures, relatively little of the light will reach the photodiode by scattering or by light reflecting from objects other than raindrops. Even if some light not scattered by raindrops reaches the photodiode, it does not significantly prevent the detection of raindrops. It does, however, decrease the dynamic range of the detector. The electronics, which will be described hereinbelow, will saturate with a smaller amount of rain on the windshield because some of the dynamic range is taken up by light scattered by other objects. Also as will be described hereinbelow, some light may be scattered by the presence of condensed water vapor (not shown) on inner surface 21 of windshield 17, or the presence of smoke (not shown) in the cabin of the vehicle.

FIG. 2 is a function block representation of an electronic system which is constructed in accordance with the principles of the invention. The electronics described with respect to this figure will detect the tiny fraction of the LED's light that reaches the photodiode in the large ambient light background, which can include full sunlight. Referring to FIG. 2, a clock 30 drives an LED driver 31 which is coupled to an LED array 32. LED array 32 bears analogous correspondence to LED 11 in FIG. 1. As shown in FIG. 2, the light from LED array 32 is propagated through windshield 17 and scattered in raindrop 25 so as to be reflected to photodiode 12.

Clock 30 and LED driver 31 function in combination to produce a square wave output (not shown) whereby the LED array is turned on for half of the clock period. The portion of the light propagated from LED array 32 which is received at photodiode 12 is converted into a current signal which is provided at an input of a transimpedance amplifier 35. The output of transimpedance amplifier 35 is a voltage which is proportional to the photodiode current. This voltage signal is then conducted to an amplifier 36. The output of amplifier 36 is conducted to a gain stage 37 which has a controllable gain of +1 or −1, and is used to separate the signal from the background. As shown, gain stage 37 has inputs for receiving phase references from clock 30. The gain is set to +1 when the LED is on, and to −1 when the LED is off. Since the ambient light is the same during the two halves of the clock period, the sum of the two halves is (rain signal+ambient light) when the gain is +1 and (−ambient) when the gain is −1. When these are added together, the result is the rain signal, i.e., (rain signal+ambient)+(−ambient)=rain signal.

An averaging stage 38 produces an average over time τ which is long compared to a clock period. The addition described hereinabove which separates the rain signal from the ambient background occurs in averaging stage 38. An output amplifier 39 provides additional gain and produces at its output the rain signal.

In order to change the sensitivity of the rain detector to correspond to night driving conditions for which the eye is more disturbed by rain on the windshield, an ambient light signal is derived from the output of transimpedance amplifier 35. During daytime operation, the ambient light generates a much larger current in the photodiode than the light backscattered by the raindrops so that the output of the transimpedance amplifier is approximately a measure of the ambient light signal. During low sky brightness conditions, the amplitude of the ambient light signal is reduced. That information is sent to a microprocessor, as will be described hereinbelow.

FIG. 3 is a function block representation of a microprocessor 40 coupled at an output thereof to a wiper control 41. Microprocessor 40 is provided with an analog-to-digital convertor (not shown) which changes the threshold level rain signal necessary to generate a wipe to be reduced. In addition, microprocessor 40 provide control signals for the ventilator and dehumidifier controls, as will be described below.

Wiper control 41 is coupled at its input to microprocessor 40, and at its output to a windshield wiper timer 43. As will be discussed below, the wetness of the windshield (not shown) may be determined by the speed of the wipe of the windshield wipers (not shown). Such speed can be determined with the aid of wiper timer 43, which produces a signal at its output which corresponds to the time duration of a wipe of the windshield wipers. Microprocessor 40 is shown to be coupled to a window control 44 and to a top control 46. As stated, the microprocessor also controls the operation of ventilator control 48 and dehumidifier control 49.

Another situation for which the threshold level necessary to generate a wipe by the wipers should be reduced is when large drops of rain strike the windshield. For a given area of the windshield covered by small or large raindrops, large drops are visually much more distracting to a driver. A mathematical expression sensitive to the fractionally larger statistical fluctuations of large drops versus small drops can be written as:

$$Q = \frac{\sum_{i=1}^{n} (m_i - m_{ave})^2}{n(m_{ave})^2} \qquad \text{(Eq. 1)}$$

Here, $m_i$ is the change in the rain signal between the $i^{th}$ time element and the $(i-1)$ time element that occur between two successive passages of the wiper blade past the rain sensor, and $m_{ave}$ is the average value of $m_i$ over the interval between two successive wipes. The quantity Q is the square of the standard deviation of $m_i$ normalized by $(m_{ave})^2$ in order to make a dimensionless ratio. For larger raindrops which are characterized by larger fluctuations, Q is larger than for small drops and may be used to reduce the threshold level of the rain signal necessary to generate a wipe. Also, FIG. 3 shows three inputs to the microprocessor: the rain signal, the ambient light signal, and a separate input set by the driver (not shown) to adjust the threshold amount of rain that generates an output to the wiper control which initiates a wipe.

There are times when it is difficult to tell when the windshield is wiped clean of all water. For example, if the water is a thin, very smooth sheet, it will scatter little radiation to the photodetector. Another way of getting an independent measure of the dryness of a windshield is by monitoring the time between successive wipes of a windshield wiper. As the windshield gets drier, there is more friction between the wiper and the glass, and the wiper motor slows down increasing the time between wipes. Monitoring the time between successive passages of the wiper blade in front of the rain sensor, the passage of the wiper appears as a very large amplitude signal which last for a small fraction of the time between wipes. This characteristic can be used by microprocessor 40 to determine whether the windshield is dry enough to shut down the wiper.

Figure 4:
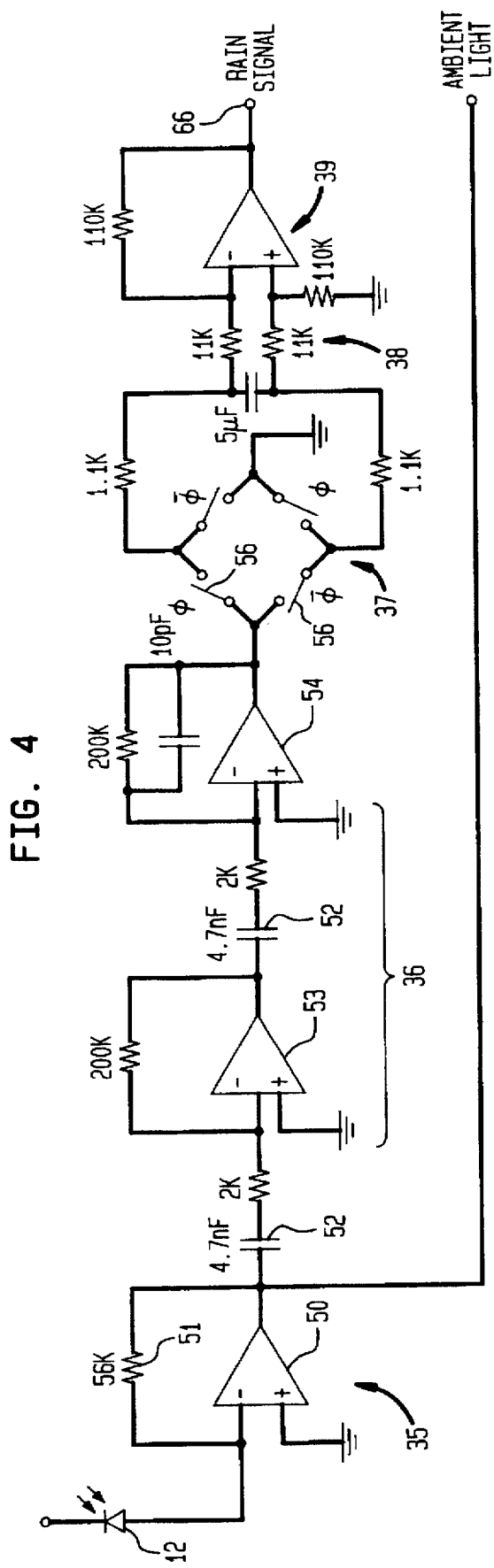
FIG. 4 is a schematic representation of a circuit which can be employed in the embodiment of FIG. 2.

FIG. 4 is a schematic representation of an electrical circuit for a phase-sensitive amplifier. As previously stated, photodiode 12 generates a current in transimpedance amplifier 35. In this specific illustrative embodiment, transimpedance amplifier 35 is formed of an amplifier 50 with a feedback resistor 51. Amplifier 50 produces at its output the ambient light signal. In this embodiment, feedback resistor 51 has a value of 56 k$\Omega$. The transimpedance amplifier is AC-coupled via a capacitor 52 to amplifier 36 which is formed of an amplifier 53 which is AC-coupled to a further amplifier 54. Amplifier 53 has a gain of 100, as does amplifier 54.

Amplifier 36 is coupled at its output to gain stage 37 which is provided with a plurality of switches 56 which are set by the complementary outputs of clock 30, which will be described hereinbelow with respect to FIG. 5.

Figure 5:
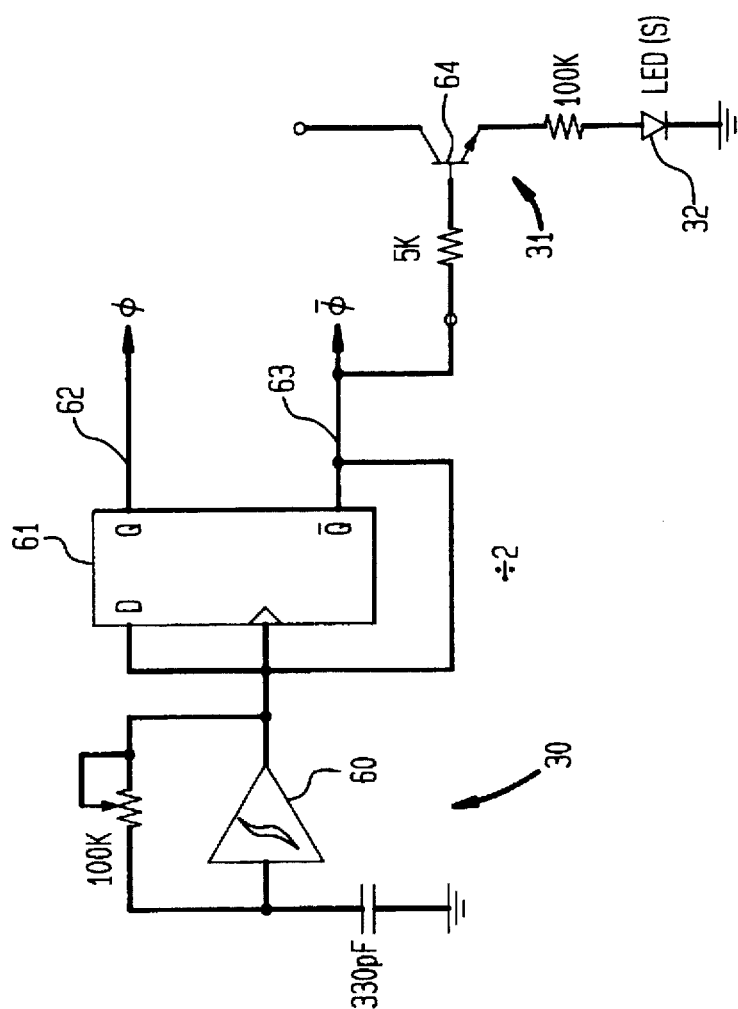
FIG. 5 is a schematic representation of circuitry which drives a light emitting diode in response to a clock.

Referring for the moment to FIG. 5, this figure is a schematic representation of clock 30 and LED driver 31. As shown, clock 30 is formed of an oscillator 60 which is coupled at its output to a type D flip-flop 61. Flip-flop 61 has complementary outputs 62 and 63, output 63 being coupled to LED driver 31, which is in the form of a transistor 64. Transistor 64 drives LED array 32, as described herein:

Referring once again to FIG. 4, switches 56 are opened and closed in response to outputs 62 and 63 of flip-flop 61 to provide the gain of +1 and −1, as described hereinabove with respect to FIG. 2. Gain stage 37 is coupled to averaging circuit 38 which is based on an RC design such that the averaging timer $\tau$=RC. In this circuit, R consists of two 1.1 K$\Omega$ resistors in series so that R=2.2 K$\Omega$, and C=5 $\mu$F, so that $\tau$=11 ms. Output amplifier stage 39 provides a final gain of 10, and provides the rain signal, as well as the fog and smoke signals, at an output 66 thereof.

As previously described, the present invention is useful to determine the presence of condensed water vapor on the interior surface of the windshield, and smoke in the cabin of the vehicle. In embodiments of the invention where it is desired to determine the presence of condensation on the windshield or smoke, the present invention is operated to separate out the three signals, rain, fog, and smoke, and not get confused by the windshield wipers going back and forth.

The logic behind this process is as follows: The lowest level signal coming out of the lock-in amplifier is stored as a "clean windshield signal." Thus, the passing back and forth of the windshield wipers does not confuse the data processing when there is a rapid increase in signal (one with a rise and fall time of about 100 ms, which) is easily recognized and excluded from the data that is analyzed. The moisture signal rises linearly from the clean windshield level with a characteristic time of from 20 seconds to several minutes. It has an amplitude which is many times larger than the largest rain signal so that it will not be confused with the buildup of rain on the windshield. Also, when the wipers are wiping, the moisture signal will not change when the wipers pass. Mostly, when there is condensing moisture on the glass, it is raining so there are a variety of conditions that must be satisfied for the microprocessor to have detected an interior fog condition. The confirming signature is that when fog is detected condensing on the windshield which causes the air conditioner to turn on, the signal (lock-in amplifier output signal) should decrease rapidly (the time scale is short compared to the time required for the fog to buildup) to the clean window level. In terms of the output signal going to the air conditioner, it could be either a binary signal when a predetermined level of fog is detected, or it could be a calibrated signal which is proportional to the amount of fog on the windshield and would be used to turn the dehumidifier on and off.

The smoke detecting process is similar to that described above. After the wiper passage is removed from the signal (the output signal from the lock-in amplifier), a large rapid variation with a time scale of from 250 ms to 5 seconds is the first condition that must be satisfied by a smoke signal. These times are clearly distinct from the passage of the wipers and from variation due to fog. In addition, these signals are many times larger than any rain signal or splash, and constitute the second condition that must be satisfied. Also, the time for the smoke signal to increase is always less than the time for it to decrease, the third condition. It is more difficult to make a signal output proportional to the amount of smoke. It would be preferable to have a binary output that is used to control the admission of outside air into the passenger compartment.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. An arrangement for detecting the presence of water droplets on a windshield of a vehicle, the windshield being illuminated by ambient light in a field of ambient illumination, the arrangement comprising:

light source means having active and inactive states for producing a radiant energy during the active state and directing same toward the windshield, a first portion of the radiant energy being reflected by the windshield to a first illumination field, and a second portion of the radiant energy being scattered by the water droplets on the outside and inside of the windshield, and thereby reflected to a second illumination field;

light sensor means having an input for receiving an ambient light and a portion of the radiant energy produced by said light source means, said light sensor means further having a sensor output for producing a sensor output electrical signal responsive to light received at the input;

a baffle for defining a predetermined field of view of said light sensor means, the predetermined field of view being substantially exclusive of the first illumination field and inclusive of at least a portion of the second illumination field, whereby the sensor output electrical signal is substantially responsive to the ambient light and the second portion of the radiant energy produced by said light source means;

circuit means coupled to said sensor output for producing a first electrical signal responsive to the received portion of the second portion of the radiant energy from said light source means, and a second electrical signal substantially responsive to the ambient light received by said light sensor means, the first electrical signal being substantially responsive to a difference between the sensor output electrical signal produced by said light sensor means during the active state of said light source means and the sensor output electrical signal produced by said light sensor means during the inactive state of said light source means; and processor means having a first input for receiving the first electrical signal and a first output for producing a control signal having a characteristic responsive to water droplets on the windshield.

2. The arrangement of claim 1 wherein the second portion of the radiant energy corresponds substantially to the relative portion of the windshield that is covered by the water droplets.

3. The arrangement of claim 1 wherein said circuit means comprises driver means coupled to said light source means, said driver means producing a cyclical enabling signal having sequential first and second states for causing said light source means to enter the active state to produce the radiant energy during intervals of time that the cyclical enabling signal is in the first state, and to enter the inactive state during intervals of time that said cyclical enabling signal is in the second state.

4. The arrangement of claim 3 wherein said circuit means comprises:

amplifier means coupled to said sensor output for producing an amplified signal responsive to the electrical signal responsive to light received at said input of said light sensor means; and phase-responsive means coupled to said amplifier means and to said driver means for producing a time-varying signal responsive to a difference between the magnitude of the sensor output electrical signal when the cyclical enabling signal is in the first state and the magnitude of the sensor output electrical signal when the cyclical enabling signal is in the second state.

5. The arrangement of claim 4 wherein said amplifier means comprises:

first and second amplifier stages, each having a predeterminable gain characteristic; and ac coupling means for coupling said first and second amplifier stages to one another.

6. The arrangement of claim 4 wherein there is further provided integration means coupled to said phase-responsive means for integrating the time-varying signal over time to produce a rain signal, said integration means having an integration time constant characteristic which is longer than a cycle of the cyclically enabling signal.

7. The arrangement of claim 6 wherein there is further provided sensitivity control input coupled to said processor means for receiving a sensitivity signal for predetermining a quantum of water droplets characteristic of the control signal.

8. The arrangement of claim 6 wherein the vehicle is provided with a windshield wiper, and there is further provided windshield wiper control means for operating a windshield wiper in response to the control signal.

9. The arrangement of claim 8 wherein there is further provided windshield wiper timing means for producing a signal responsive to the duration of a wipe cycle of the windshield wiper.

10. The arrangement of claim 6 wherein the vehicle is provided with a window, and there is further provided window control means for operating the window in response to the control signal.

11. The arrangement of claim 6 wherein the vehicle is provided with an openable top, and there is further provided openable top control means for operating the openable top in response to said control signal.

12. The arrangement of claim 6 wherein the vehicle is provided with a convertible top, and there is further provided a convertible top control means for operating the convertible top in response to the control signal.

13. The arrangement of claim 6 wherein the cyclical enabling signal has a frequency characteristic within a range of approximately between 5 kHz and 100 kHz.

14. An arrangement for producing a control signal in response to the presence of liquid droplets on a translucent material having first and second surfaces, the arrangement comprising:

light source means for producing a radiant energy and directing same toward at least a portion of the first surface of the translucent material, a first portion of the radiant energy being reflected by the translucent material, and a second portion of the radiant energy being scattered by the water droplets on the first and second surfaces of the translucent material;

light sensor means having an input for receiving an ambient light and a received portion of the second potion of the radiant energy from said light source means, the input of said light sensor means being arranged to exclude the first portion of the radiant energy, the second portion of the radiant energy having an amplitude that is responsive to the number of water droplets on the first and second surfaces of the translucent material, said light sensor means further having a sensor output for producing a sensor output electrical signal responsive to light received at the input;

cyclical driver means coupled to said light source means for causing said light source means to produce the radiant energy during a portion of a cycle, at a predetermined cycle frequency;

control signal means coupled to said light sensor means and to said cyclical driver means for producing the control signal in response to a differential between the magnitude of the sensor output electrical signal when said light source means is illuminated and the magnitude of the sensor output electrical signal when said light source means is dark, over a plurality of cycles of said cyclical driver means.

15. The arrangement of claim 14 wherein an ambient light impinges upon the surface of the translucent material, and there is further provided means for producing an ambient light signal having a magnitude which is responsive to the magnitude of the sensor output electrical signal when said light source means is dark.

16. The arrangement of claim 15 wherein there is further provided controller means for producing a controller signal responsive to the ambient light signal and the control signal produced by said control signal means.

17. The arrangement of claim 16 wherein there is further provided input means coupled to said controller means for receiving a sensitivity signal which adjusts the sensitivity of the arrangement.

18. A method of producing a signal responsive to droplets of a liquid on a surface of a translucent material, the translucent material having first and second surfaces, the method comprising the steps of:

- illuminating the second surface of the translucent material with a cyclically varying light which is in an illuminated state for a first portion of a cycle and dark for a second portion of the cycle;
- excluding at a light sensor a portion of the cyclically varying light that is reflected by the translucent material;
- receiving at the light sensor an ambient light and a further portion of the cyclically varying light that is scattered by the droplets of the liquid on the first or second surface of the translucent material;
- producing at an electrical output of the light sensor a sensor signal corresponding to the light received by the light sensor;
- separating the sensor signal of the light sensor during each cycle into a first sensor signal component corresponding to the sensor signal during the first portion of the cycle, and into a second sensor signal component corresponding to the sensor signal during the second portion of the cycle; and
- producing a difference signal responsive to the difference in the magnitude of the first and second sensor signal components over a plurality of the cycles.

19. A method of producing a plurality of signals, each responsive to a predetermined environmental condition of a vehicle of the type having a windshield having interior and exterior surfaces, the method comprising the steps of:

- energizing a source of illumination whereby electromagnetic energy is directed toward the interior surface of the windshield, the electromagnetic energy being in the form of a cyclically varying light which is emitted while the source of illumination is in an illuminated state for a first portion of a cycle, the electromagnetic energy not being emitted while the source of illumination is dark during a second portion of the cycle;
- receiving at a light sensor an ambient light and a portion of the cyclically varying light, during the illuminated state, that has been scattered in response to the environmental condition at the interior surface or exterior surface of the windshield;
- defining a predetermined field of view of said light sensor, the predetermined field of view at least partially including a field illuminated by the scattered cyclically varying light, and excluding a field illuminated by the cyclically varying light that has exclusively been reflected by the windshield, during the illuminated state of the source of illumination;
- producing at an electrical output of the light sensor a sensor signal corresponding to the light received by the light sensor in the predetermined field of view; and
- producing a control signal corresponding to a difference between the magnitude of the sensor signal while the source of illumination is in the illuminated state and the magnitude of the sensor signal while the source of illumination is dark, over a plurality of the cycles of the cyclically varying light.

20. The method of claim 19 wherein the environmental condition is water droplets being deposited on the exterior of the windshield, and the cyclically varying light in said step of receiving is scattered by the water droplets.

21. The method of claim 19 wherein the environmental condition is water vapor condensing on the interior of the windshield, and the cyclically varying light in said step of receiving is scattered by the condensed water vapor.

22. The method of claim 19 wherein the environmental condition is the presence of smoke particles in the vehicle and interposed in a light path between the source of illumination and the light sensor, and the cyclically varying light in said step of receiving is scattered by the smoke particles.

* * * * *